No. 744,479. PATENTED NOV. 17, 1903.
J. A. BUTLER.
RAZOR STROPPING DEVICE.
APPLICATION FILED MAR. 2, 1903.
NO MODEL.
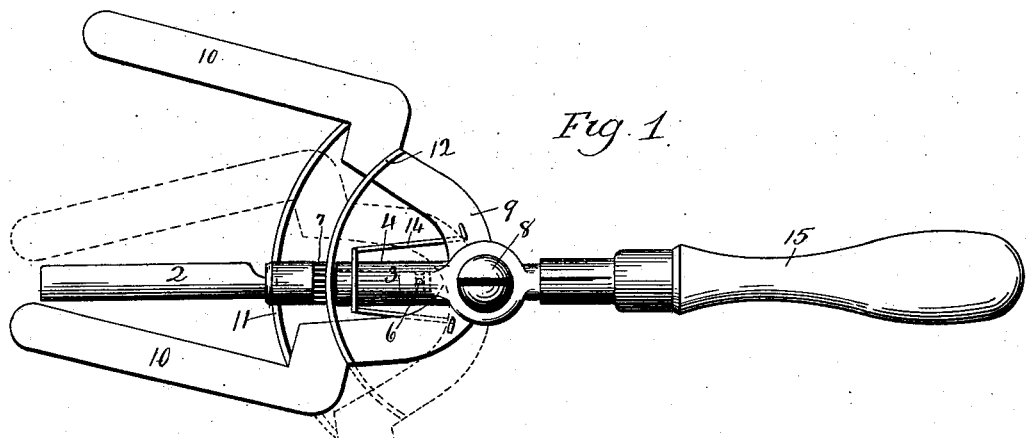
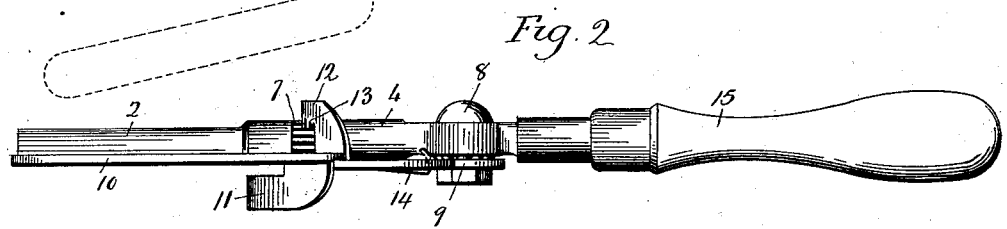
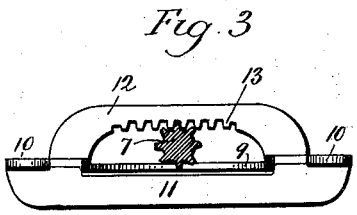
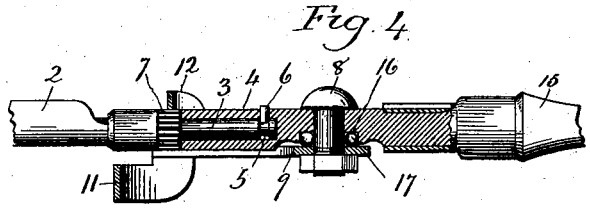

No. 744,479. Patented November 17, 1903.

UNITED STATES PATENT OFFICE.

JOHN A. BUTLER, OF SOUTHINGTON, CONNECTICUT.

RAZOR-STROPPING DEVICE.

SPECIFICATION forming part of Letters Patent No. 744,479, dated November 17, 1903.

Application filed March 2, 1903. Serial No. 145,626. (No model.)

*To all whom it may concern:*

Be it known that I, JOHN A. BUTLER, of Southington, in the county of Hartford and State of Connecticut, have invented a new and useful Improvement in Holders for Stropping Safety-Razors; and I do hereby declare the following, when taken in connection with the accompanying drawings and the numerals of reference marked thereon, to be a full, clear, and exact description of the same, and which said drawings constitute part of this specification, and represent, in—

Figure 1, a top or plan view of my improved holder for stropping safety-razors, illustrating the plate as turned to the extreme positions; Fig. 2, a side view of the same; Fig. 3, an end view with the blade-holder removed, showing the blade-holder pinion in connection with the yoke-rack; Fig. 4, a broken side view partially in longitudinal section through the shank.

This invention relates to an improvement in holders for stropping safety-razors, the object of the invention being a simple arrangement of parts whereby the razor-blade is so mounted that it is in control of the operator and reverses in position according to the direction in which the holder is moved; and the invention consists in certain details of construction and combinations of parts, as will be hereinafter described, and particularly recited in the claims.

The blade-holder 2 is of usual construction and mounted upon a stem 3, swiveled in a shank 4. As herein shown, the stem is formed with an annular groove 5 near its inner end, into which a pin 6 extends and so that the stem may be revolved in the shank, but is held against longitudinal movement therein. Upon the stem beyond the end of the shank is a pinion 7. Secured to the shank by a bolt or rivet 8 is a U-shaped plate 9, provided with outwardly-projecting arms or fingers 10. These arms are connected by a bowed guide 11, passing beneath the blade-holder, and mounted upon the plate is a bowed yoke 12, formed in its under edge, with teeth 13 meshing with the pinion 7, the curvature of the yoke being concentric with the rivet 8, upon which the plate is mounted, so that as the plate is turned the rack will always mesh with the pinion. To return the plate from either of its extreme movements, I connect two ends of a spring-wire 14 to the opposite sides of the plate near the rivet, the wire extending forward and over the shank near the yoke 12, so as to bear upon opposite sides thereof. The end of the shank is adapted to receive the usual handle 15, and preferably the shank around the rivet will be formed with a groove 16 to receive antifriction-balls 17, which thus stand between the shank and the face of the plate 9.

In its normal position the blade-holder stands with its edges upward, so that a razor-blade may be conveniently inserted therein. The fingers 10 being pressed upon a strap and the handle drawn downward will turn the plate 9 to one side, as shown in full lines in Fig. 1. This position of the plate turns the edge of the blade downward upon the strap; but when the holder is moved upward upon the strap the frictional engagement of the fingers with the strap causes the plate to turn to the opposite side, as shown in broken lines in Fig. 1, which turning by the engagement of the teeth on the yoke with the pinion on the blade-holder reverses the position of the blade and causes its edge to drag upon the strap. The guide 11, bearing upon the edge of the strap, not only assists in holding the razor against the strap, but the frictional engagement between the guide and the edge of the strap assists in turning the plate to reverse the position of the blade at the ends of the stroke. The ball-bearing at the connection between the plate and the shank increases the ease of operation.

Having fully described my invention, what I claim as new, and desire to secure by Letters Patent, is—

1. In a holder for stropping safety-razors, the combination of a blade-holder swivelly mounted in the shank and carrying a pinion, a plate pivoted to said shank and formed with outwardly-extending fingers, a yoke-rack secured to said plate and extending over said pinion with which it engages, whereby the turning of the plate moves the fingers from one side to the other and reverses the blade without changing the relation of the blade-holder to the handle, substantially as described.

2. In a holder for stropping safety-razors, the combination with a blade-holder secured to a stem, said stem swivelly mounted in the shank, a pinion on said stem, a plate pivoted to said shank and provided with outwardly-extending arms, said arms connected by a guide extending below said shank, a bowed yoke-rack secured to said plate and extending over the pinion on the stem, and a handle at the outer end of said shank, whereby the turning of the plate moves the fingers from one side to the other and reverses the blade without changing the relation of the blade-holder to the handle, substantially as described.

3. In a holder for stropping safety-razors, the combination with a shank, of a stem swivelly mounted therein and carrying a pinion and a blade-holder, a plate pivoted to said shank and formed with outwardly-extending fingers, a yoke-rack secured to said plate and extending over said pinion, with which it engages, a handle secured to said shank and antifriction-balls between the shank and the plate, substantially as described.

In testimony whereof I have signed this specification in the presence of two subscribing witnesses.

JOHN A. BUTLER.

Witnesses:
FREDERIC C. EARLE,
CLARA L. WEED.